United States Patent
Luo et al.

(10) Patent No.: US 8,270,695 B2
(45) Date of Patent: Sep. 18, 2012

(54) DIAGNOSTIC IMAGE PROCESSING WITH AUTOMATIC SELF IMAGE QUALITY VALIDATION

(75) Inventors: Hui Luo, Rochester, NY (US); Xiaohui Wang, Pittsford, NY (US); Mary E. Couwenhoven, Fairport, NY (US)

(73) Assignee: Carestream Health, Inc., Rochester, NY (US)

( * ) Notice: Subject to any disclaimer, the term of this patent is extended or adjusted under 35 U.S.C. 154(b) by 746 days.

(21) Appl. No.: 12/485,072

(22) Filed: Jun. 16, 2009

(65) Prior Publication Data

US 2010/0086182 A1    Apr. 8, 2010

Related U.S. Application Data

(60) Provisional application No. 61/103,338, filed on Oct. 7, 2008.

(51) Int. Cl.
*G06K 9/00* (2006.01)
(52) U.S. Cl. ...................................................... 382/128
(58) Field of Classification Search .......... 382/128–131, 382/190, 218
See application file for complete search history.

(56) References Cited

U.S. PATENT DOCUMENTS

| 6,370,277 | B1 | 4/2002 | Borrey et al. |
| 7,266,229 | B2 | 9/2007 | Couwenhoven et al. |
| 7,321,674 | B2 | 1/2008 | Vuylsteke |
| 7,386,155 | B2 | 6/2008 | Foos et al. |
| 7,466,323 | B2 * | 12/2008 | Krishnamurthy et al. .... 345/634 |
| 8,051,386 | B2 * | 11/2011 | Rosander et al. ............. 715/810 |
| 2005/0063575 | A1 * | 3/2005 | Ma et al. ...................... 382/128 |
| 2005/0256743 | A1 | 11/2005 | Dale |
| 2006/0095429 | A1 | 5/2006 | Abhyankar et al. |
| 2006/0155579 | A1 * | 7/2006 | Reid ............................... 705/2 |
| 2008/0118139 | A1 | 5/2008 | Huo et al. |

FOREIGN PATENT DOCUMENTS

JP    2008076616    4/2008

* cited by examiner

*Primary Examiner* — Daniel Mariam

(57) ABSTRACT

A method for medical diagnostic image processing obtains digital image data for a diagnostic image and extracts one or more image features from the image data, obtaining one or more image properties from the one or more extracted features. An image quality aim is obtained for rendered image appearance according to one or more stored viewer preferences. Rendering parameters are generated according to the obtained image quality aim and the one or more obtained image properties. The image is rendered according to the generated rendering parameters and the rendering validated against the selected image quality aim.

20 Claims, 7 Drawing Sheets

DIAGNOSTIC IMAGE PROCESSING WITH AUTOMATIC SELF IMAGE QUALITY VALIDATION

CROSS REFERENCE TO RELATED APPLICATIONS

Reference is made to, and priority is claimed from, commonly assigned U.S. Ser. No. 61/103,338, provisionally filed on Oct. 7, 2008, entitled METHOD FOR AUTOMATIC QUANTIFICATION OF DIGITAL RADIOGRAPHIC IMAGE QUALITY to Wang et al.

FIELD OF THE INVENTION

The present invention relates generally to image processing of diagnostic images and in particular to a method for rendering the diagnostic image within a feedback loop for automatic adjustment and validation of image quality.

BACKGROUND OF THE INVENTION

With the transition from analog to a digital imaging, digital radiographic systems have been adopted by the medical imaging community and now represent the standard of care at many hospitals and imaging centers. Among other advantages, digital radiographic imaging has an expanded dynamic range, with the potential for providing much richer information about anatomic structures for image diagnosis than is available using conventional analog radiographic images. However, this expanded capability brings with it some additional complexity, requiring image processing that is capable of handling the digital radiographic image data in order to best render the image for diagnostic use. One method for diagnostic image rendering is taught, for example, in commonly assigned U.S. Pat. No. 7,266,229 entitled "Method for Rendering Digital Radiographic Images for Display Based on Independent Control of Fundamental Image Quality Parameters" to Couwenhoven et al.

As part of the diagnostic procedure, it can be helpful to present, in a consistent manner, images of the same patient anatomy but taken at different times, at different stages of treatment, or on different imaging systems. One approach is to normalize the image representation, as described in U.S. Pat. No. 7,321,674 entitled "Method of Normalising a Digital Signal Representation of an Image" to Vuylsteke. In this process, a normalization parameter is derived from the image content itself and applied to normalize the image data accordingly.

Consistent rendering, as taught in the Couwenhoven et al. '229 patent and as applied in the example embodiment described in the Vuylsteke '674 disclosure, can be but one of a number of aspects of image rendering that are of particular interest for diagnostic review and assessment. While there can be value for consistent rendering in some applications, other imaging situations benefit more from a proper choice of suitable parameters that show particular details of the image content more effectively for diagnosis. Thus, other image rendering goals can be to maximize global or detail-related contrast, brightness, and sharpness, for example, which may override image consistency considerations.

Approaches have been proposed for evaluating image quality of diagnostic images, directed to identifying quality problems detected by expert observers or trained expert systems, maintaining statistical data on technologist and practitioner performance, and determining whether or not the overall image quality is sufficient for diagnostic purposes. However, these conventional solutions go no further than providing some base-level assurance of image quality, accumulating metrics that relate to various image quality characteristics as a measure of overall acceptability for diagnosis.

Provided that at least rudimentary image quality is achieved, an aspect of diagnostic value for digital x-rays and other diagnostic images relates to image presentation, that is, to how the image data is rendered for display to the clinician. Viewer preference plays an important part in how effectively the digital image can be used, as is acknowledged in commonly assigned U.S. Pat. No. 7,386,155 entitled "Transforming Visual Preference Terminology for Radiographic Images" to Foos et al. A specific practitioner may have preferred settings for image characteristics such as brightness, sharpness of detail, contrast, and latitude, for example. Values for these image characteristics can be adjusted over a range of settings according to how the image is rendered. Although some diagnostic display systems may allow viewer adjustment of rendering parameters from one image to the next, this adjustment and rendering processing takes time and it can be burdensome to the radiologist workload to make adjustments to individual images in order to suit viewer preferences.

Thus, it can be appreciated that there would be advantages to a diagnostic imaging system that allows a measure of flexibility in rendering and in the specification of how the image is to be presented for diagnosis, and that allows automated and easily customized rendering for different viewers or for different types of images.

SUMMARY OF THE INVENTION

It is an object of the present invention to advance the art of diagnostic image processing. With this object in mind, the present invention provides a method for medical diagnostic image processing executed at least in part by a computer and comprising: obtaining digital image data for a diagnostic image; extracting one or more image features from the image data and obtaining one or more image properties from the one or more extracted features; obtaining an image quality aim for rendered image appearance according to one or more stored viewer preferences; generating rendering parameters according to the obtained image quality aim and the one or more obtained image properties; rendering the image according to the generated rendering parameters; and validating the image rendering against the selected image quality aim.

A feature of the present invention that it provides a feedback loop that allows more than one rendering iteration in order to obtain a target image quality.

An advantage of the present invention that it allows evaluation of a rendered image against any of a number of different image quality aims.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

The foregoing and other objects, features, and advantages of the invention will be apparent from the following more particular description of embodiments of the invention, as illustrated in the accompanying drawings, wherein.

DETAILED DESCRIPTION OF THE INVENTION

Figure 1:
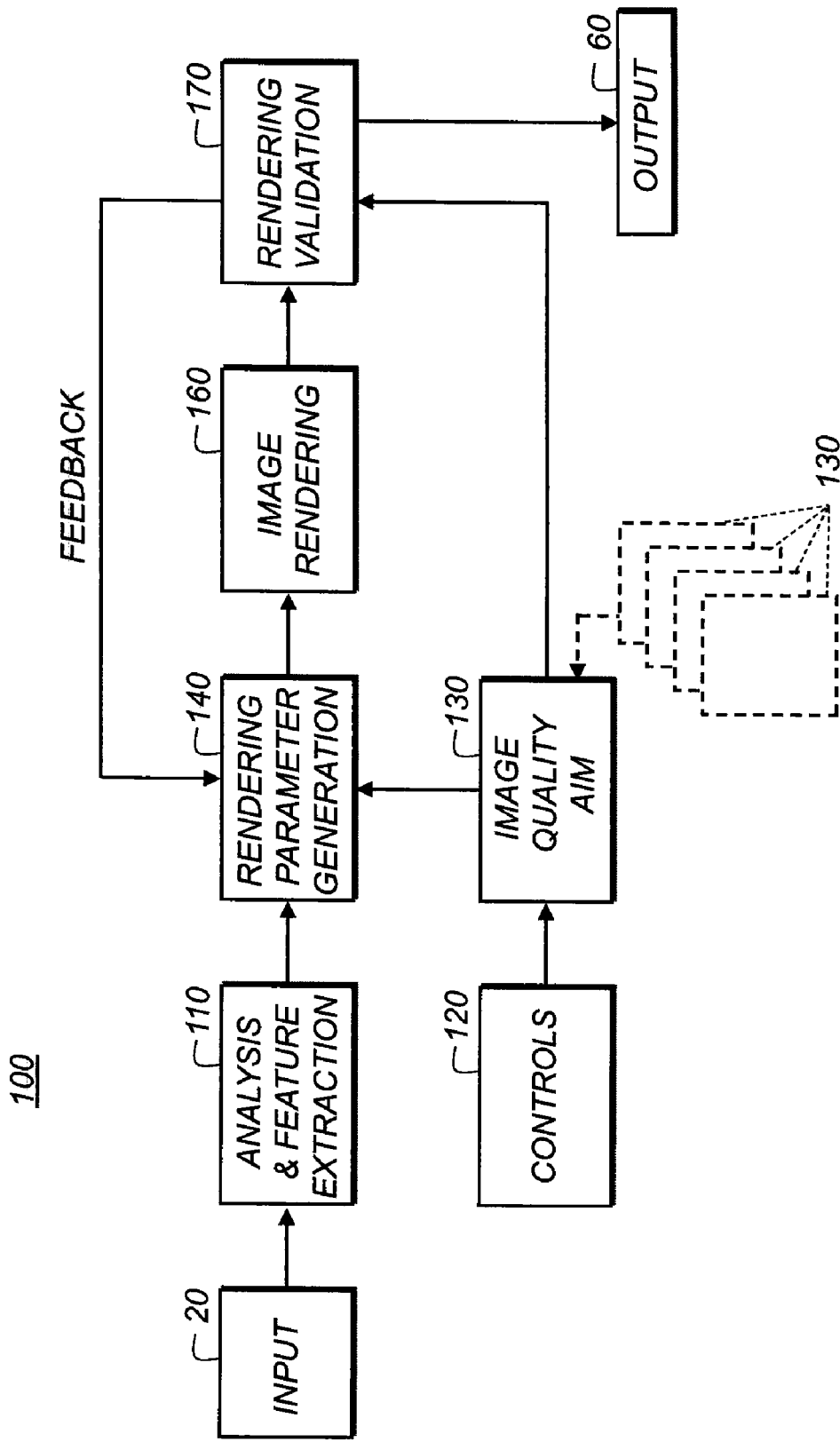
FIG. 1 is a logic flow diagram of an image rendering process according to a predetermined target in one embodiment.

The following is a detailed description of the preferred embodiments of the invention, reference being made to the drawings in which the same reference numerals identify the same elements of structure in each of the several figures.

The processing of the present invention is performed, at least in part, on a computer or other type of control logic processor, such as a dedicated or special-purpose processor, for example, that executes programmed instructions for consistency control. The computer or other type of control logic processor that is used is equipped with and in communication with the needed electronic data storage and memory circuitry for executing programmed logic instructions and for storing results. The computer may include one or more storage media, for example: magnetic storage media such as magnetic disk or magnetic tape; optical storage media such as optical disk, optical tape, or machine readable bar code or other optical encoding; solid-state electronic data storage devices such as random access memory (RAM) or read-only memory (ROM); or any other physical device or media employed to store computer software having instructions for controlling one or more computers and related data to practice the method according to the present invention.

To illustrate the methods of the present invention, the description in this section is directed primarily to chest x-rays in one exemplary embodiment. However, the method of the present invention is not limited to any one type of radiological image, but can be any of a number of modalities and can be used for imaging other parts of the body as well.

FIG. 1 is a logic flow diagram of an image rendering process 100 according to a predetermined target in one embodiment. An input digital image 20 can originate from any diagnostic image modality and may be, for example, a computed radiography (CR), digital radiography (DR), computed tomography (CT) or Magnetic Resonance Imaging (MRI) image. In the process described herein, a DR image is referenced as the example image; the same processing could also be used for other types of images that are provided as digital data, such as those just listed.

A goal of image rendering process 100 is to process the input image so that its appearance satisfies a predetermined image quality preference aim. To achieve this, an analysis and feature extraction step 110 is first implemented to analyze the properties of input digital image 20 and use the extracted image features to identify and characterize these properties. These obtained properties are then used to direct the generation of rendering parameters. The aim that is used may be derived from a model that has been set up as a guide to system parameters and performance.

Figure 2A:
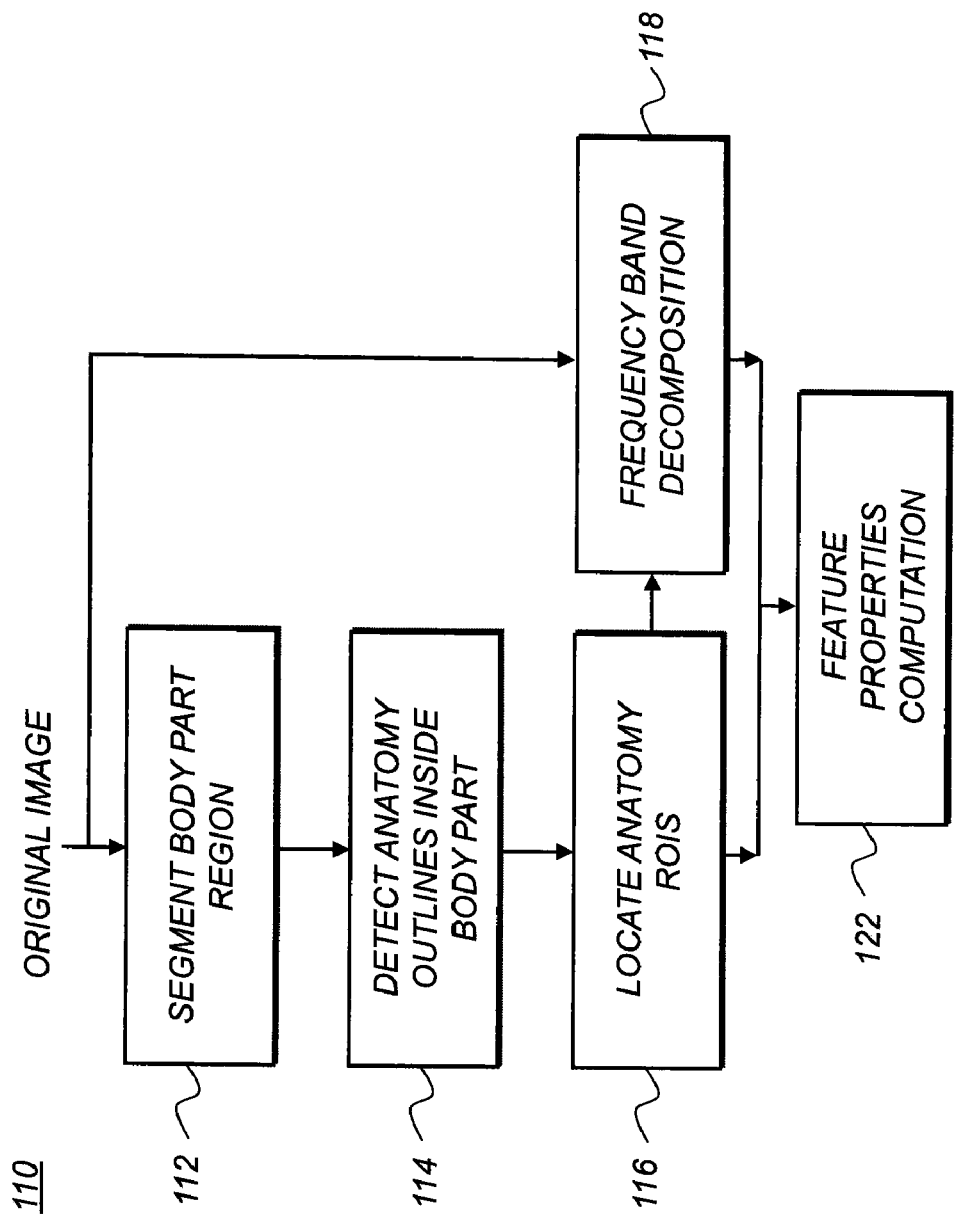
FIG. 2A is a block diagram of an image analysis method in one embodiment of the present invention.
Figure 2C:
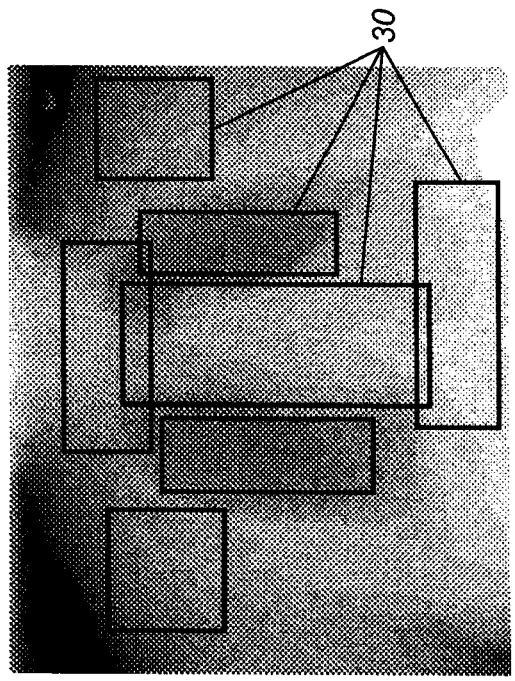
FIG. 2C shows the extracted ROIs from the processing of FIG. 2A.
Figure 2B:
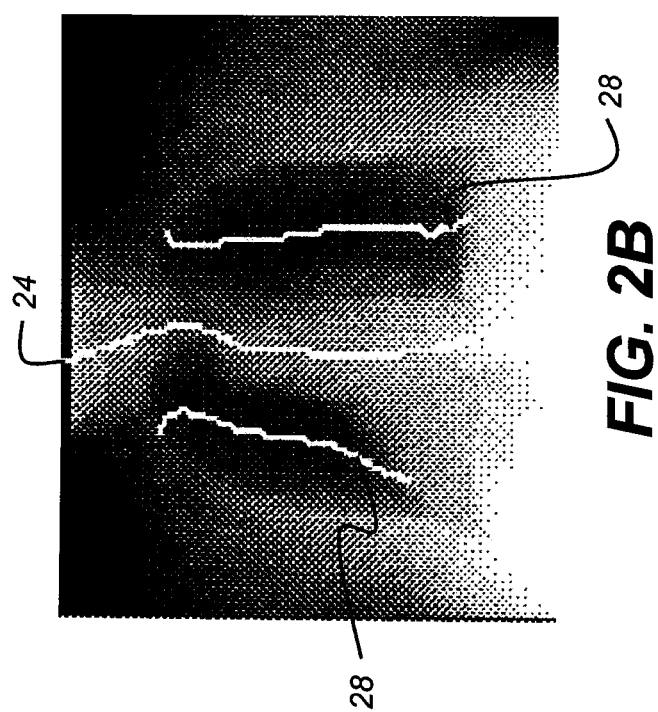
FIG. 2B shows the result image of feature line extraction from the processing shown in FIG. 2A.

According to an embodiment of the present invention, analysis and feature extraction step 110 is expected to provide the image features of the anatomical structures that are of interest as illustrated in FIG. 2A. This process includes three sub-steps. First, a segmentation step 112 is performed to detect the body part in the radiographic image. This step can be achieved by any of a number of suitable image segmentation methods known to those skilled in the imaging arts. Then, in a detection step 114, the major anatomical structures inside the skinline of the body part are analyzed and their outlines are detected to provide a rough representation of anatomical structures of the body part. Using the chest PA (posteroanterior) view image of FIG. 2B as an example, three feature lines, a spine midline 24 and two lung centerlines 28, obtained using any of a number of methods familiar to those skilled in the diagnostic imaging arts, are extracted as a rough representation of major anatomical structures of the chest image. With the help of these rough representations, an ROI (region of interest) location step 116 (FIG. 2A) locates one or more ROIs 30 of the chest image, as shown in FIG. 2C, including diaphragm, mediastinum, apex and lung regions, inside the body part skinline, for example. These ROIs 30 represent major anatomical structures of chest images. Features extracted from these ROIs are expected to indicate the overall image quality and utility of the input chest image, and properties of these features characterize the diagnostic validity of the image.

Feature extraction techniques for obtaining image characteristics or properties are familiar to those skilled in the imaging arts and can provide considerable information about the image content. Feature extraction can accurately capture the characteristics or properties of each of the input images and ROIs and provide useful information for subsequent generation of suitable rendering parameters for the image. According to one embodiment of the present invention, properties that can be computed from the image data and are of particular interest for feature extraction include image code value range and statistical data, image contrast, image density, image brightness, latitude, sharpness, regional density, signal-to-noise ratio, contrast-to-noise ratio, image histogram values, image data range, and other computed values that relate to image appearance. In addition, derived features from the above parameters can also be extracted from the image data and used to represent other useful image properties or characteristics. Furthermore, the parameters typically used to adjust images such as image sharpness, latitudes, brightness, and detail contrast can also be detected using known algorithms and used as image features.

In accordance with one embodiment of the present invention, as shown in FIG. 2A, analysis and feature extraction step 110 further provides a frequency band decomposition step 118, allowing feature extraction and analysis processing to operate on different frequency content, executing on multiple frequency band images. For frequency band decomposition step 118, the image content is de-composed according to multiple frequency bands, in the manner described in the '229 Couwenhoven et al. patent noted earlier. Each frequency band image presents image characteristics of a certain frequency range. For example, low frequency band image content contains the most information about large size image features, while high frequency band image content corresponds to the detail or fine structure features in the images. Feature extraction techniques obtain characteristics or properties from each frequency band image generated in this decomposition and quantify them, forming feature vectors that can be used to present the image. Depending on rendering preferences, the detected ROIs can be used in the frequency band images to assist local feature extraction. As shown in FIG. 2A, a feature computation step 122 follows, in which one or more properties for each feature or region of interest are computed.

Continuing with the sequence of FIG. 1, an electronically stored or derived image quality aim 130 provides important information that is first used to help define the overall image rendering process. According to the present invention, image quality aim 130, which may also be termed a preference aim, would use a set of images whose appearances have been manually selected or adjusted by users using operator controls 120, such as by being prompted for identifying a preferred image rendering from a user interface, for example. A particular image quality aim 130 may use a library or database that stores multiple instances of image quality aim 130 as shown in FIG. 1, indexed according to viewer identification, type of image, imaging system, or other criteria.

According to another embodiment of the present invention, image quality aim 130 is a distribution of image properties for features generated from a set of one or more images that are known to have aim quality. Using the image feature distribution from a set of aim quality images as representative of the image quality aim can help to more accurately identify desirable image properties. With a database of electronically stored aim quality images, statistical analysis can be used to define image quality aims. For doing this, properties of features from images in the image quality aim database, obtained using any of a number of appropriate image analysis utilities, can provide a distribution of image parameters that are most useful for image quality assessment and validation. For example, a distribution of the image quality aim for chest x-ray characteristics can be generated by studying the full set of chest images that are stored for the image quality aim.

As an illustrative example, after analyzing image feature values for a set of stored images in feature space, the following properties of the image features are identified.

A preference range of the diaphragm region in chest images is within [1500, 2000].
A preference range of the mediastrinum region in chest images is within [1100, 1300].
A preference range of the apex and shoulder regions in chest images is within [800, 1000].
A preference range of lung fields in chest images is within [500, 750].

Given this exemplary set of preference ranges, the analyzed range/distribution can then be used as the image quality aim in order to direct image rendering parameter generation and evaluation of image rendering results.

Still referring to the sequence of FIG. 1, a rendering parameter generation step 140 then uses image properties information extracted from the input image in extraction step 110 and data from image quality aim 130 in order to produce parameters suitable for an image rendering step 160. As mentioned earlier, the information about the image and features of the input image represent the specific characteristics or properties of the input image. Rendering parameter generation step 140 generates a set of parameters for rendering the image in accordance with the image quality aim or the target image.

Figure 3:
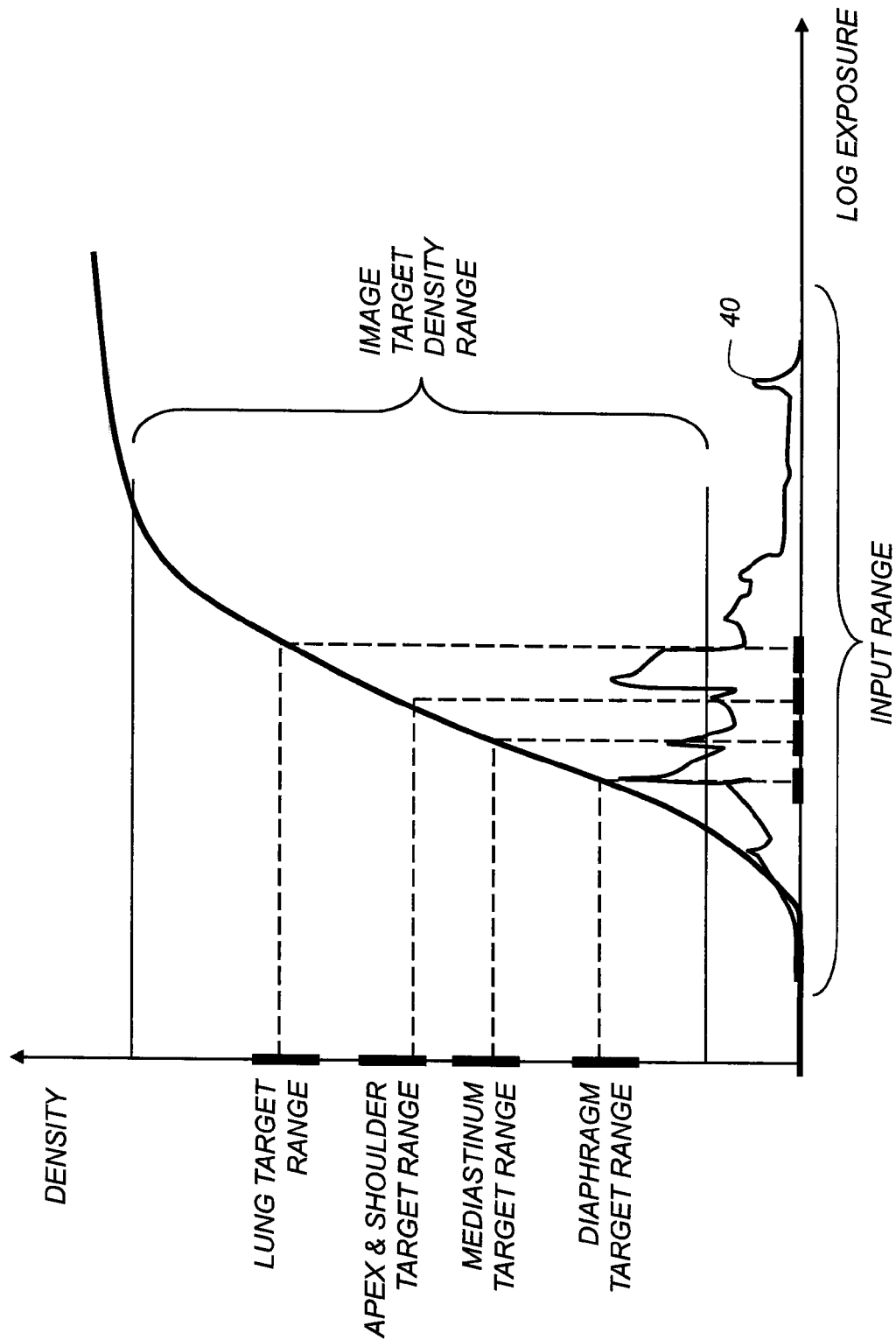
FIG. 3 shows an example of tone scale function generation using image analysis results.

Still referring to the chest PA view image as an example, the tone scale function provides image rendering parameters that transform the image from log exposure to density. During the rendering transformation, the tone scale function adjusts not only the overall image density and dynamic range of the image, but also adjusts image contrast in order to optimize the image display quality of the rendered image in one embodiment. To provide rendered images that satisfy the image quality aim, rendering parameter generation step 140 (FIG. 1) calculates a tone scale function that enables the transformation of major anatomical structures and other features of the original image into the desired density range specified by the image quality aim. For example, rendering a PA view chest x-ray image in conformance with a preferred appearance requires that the image densities of diaphragm, mediastinum, apex, and lung regions be within certain ranges, as shown in the density/log exposure graph of FIG. 3. To achieve this, the original image log exposure intensities of these regions are first detected. From analysis and feature extraction step 110, the image intensity ranges and average value of significant anatomy structures can be readily computed or estimated from ROIs of the structures. These average image intensities and ranges, together with an image histogram 40, are characteristics or properties of features of the input image usable for rendering parameter generation. A mapping procedure then re-maps these values to a desired range, as shown in the example of FIG. 3, according to the selected image quality aim 130.

When there are a number of input images, a prediction model can be generated, using techniques well known in the image analysis arts, by using properties of image features of the input images and the image quality aim to predict a tone scale function. Generation of the prediction model can be achieved by statistical computation or using machine learning methods, both familiar to those skilled in the image analysis arts. Using machine learning methods, each time a new image is provided, properties related to its image features can be computed. Based on the input values of feature properties, the prediction model is used to predict a tone scale function that is used to process the image so that subsequent rendering satisfies the image quality aim.

According to one embodiment of the present invention, possible rendering parameters include other parameters in addition to the tone scale function, such as the global contrast and detail contrast, as described in the Couwenhoven et al. '229 disclosure noted earlier. Alternately, rendering parameters used for manipulating the difference frequency band images could be used. These rendering parameters can be derived from both the properties and characteristics of image features and pre-trained parameter models.

Referring back to FIG. 1, following rendering parameter generation step 140, an image rendering step 160 is then executed. Image rendering step 160 uses results from the frequency decomposition operation of frequency band decomposition/manipulation step 118 and parameters generated for rendering in step 140, as just described.

Using frequency band decomposition in step 118 (FIG. 2A), the image content can now be manipulated according to its frequencies, allowing a number of operations for adjustment to image rendering. With this processing, lower frequency bands generally represent features of large size anatomical structures in the image. Manipulation of lower frequency band data has a pronounced effect on dynamic range or latitude of the image and affects the global appearance of the image. Mid-range frequency bands generally represent mid-sized image features. Manipulation of these frequencies has a pronounced effect on image contrast, with little impact on the dynamic range. Mid- to high-frequency ranges represent smaller features in the image. Manipulation of mid- to high-frequency content affects sharpness or blurring of smaller structure features. The higher frequency ranges represent very fine image detail. Manipulation of these higher frequencies provides a corresponding degree of sharpness or blurring for fine details. The Couwenhoven et al. '229 disclosure gives more detailed information on how decomposition can be performed and on what happens with manipulation of each of the frequency bands. Part of image rendering step 160 (FIG. 1) involves reconstruction of the image from its component frequency bands, following this manipulation for rendering.

Figure 4:
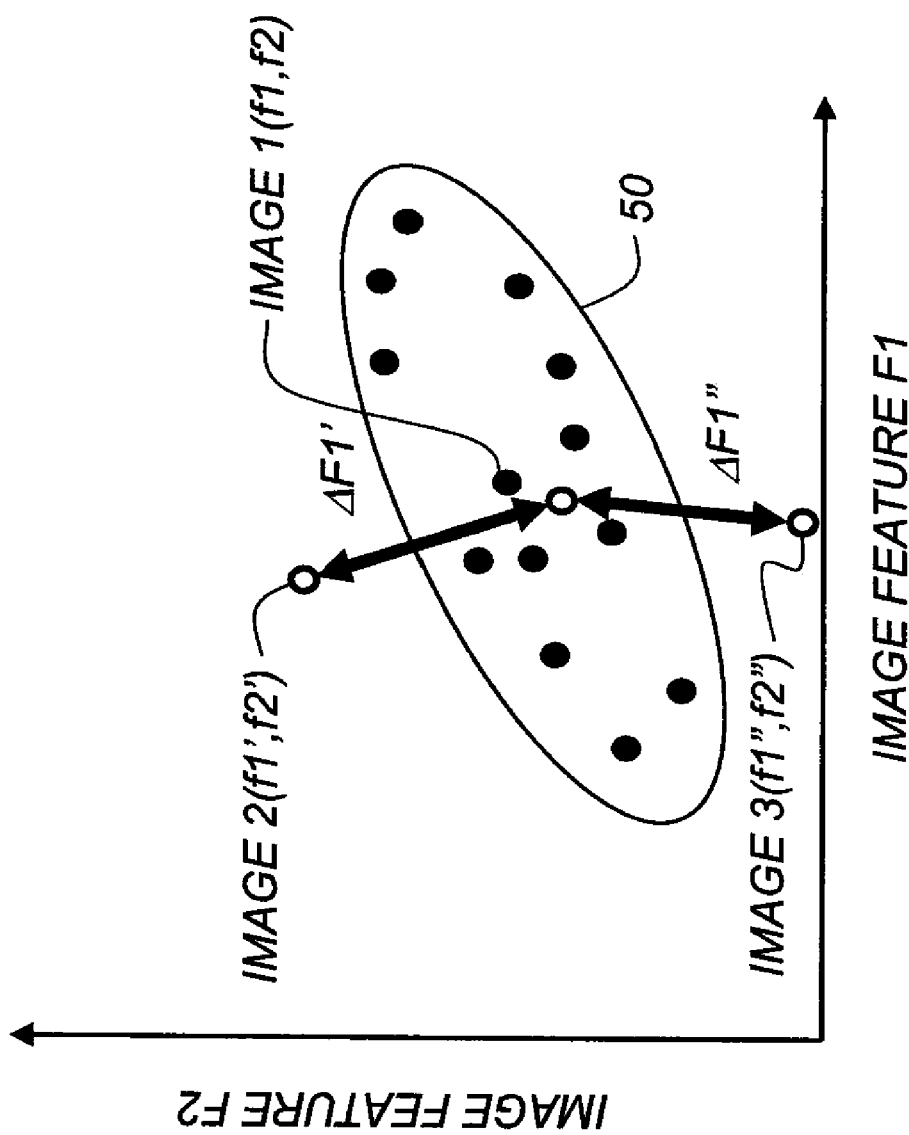
FIG. 4 illustrates image features relative to an image quality aim.

Still referring back to the sequence of FIG. 1, before the rendered image can be output, the image formed in image rendering step 160 is evaluated for its conformance to the specified image quality aim 130. This is achieved in a rendering validation step 170. In rendering validation, one or more image quality features are extracted from the rendered image and their properties compared against comparable values in an image quality aim distribution. The graph of FIG. 4 shows a target distribution 50 as determined by image quality aim 130. In FIG. 4, target distribution 50 is based on two extracted image feature properties; in practice, more than two dimensions may apply, depending on the number of properties of image features selected for image quality evaluation and specified as image quality aim 130. The image property for evaluation may be, for example, any of contrast, brightness, sharpness, or other characteristic, as described previously.

Referring to FIG. 4, properties for two image features (F1 and F2) are extracted from a given rendered image, with at least one property obtained. The rendered image is represented as a point with coordinates (f1,f2) in the two-dimensional image feature space of FIG. 4. If point (f1, f2) lies within the target distribution 50 as depicted for Image 1 in FIG. 4, the rendered image conforms to the requirement of image quality aim 130. Therefore, the rendered image achieves the image quality aim requirement and can be output as the final rendering result. Conversely, if the properties of image features of rendered new images are outside of the target distribution 50, as are Images 2 (f1',f2') and 3 (f1",f2") in the example shown, the rendered images fail to meet the image quality aim. In such a situation, the feature distances between the rendered image and the target distribution center are estimated and are provided as feedback data for improving the rendering process. Rendering parameter generation step 140 (FIG. 1) may then be executed an additional time, with any necessary adjustment to correct according to the image quality deficiency, and subsequent image rendering and validation steps 160 and 170 may then be repeated for the input image 20.

This looping rendering and validation action can be repeated as many times as needed, with different levels of correction applied, until properties of interest for the given features (represented as F1 and F2 in the example just described) conform closely enough to the specified image quality aim 130. With respect to FIG. 4, as adjustments from this feedback loop have the intended effect, the corresponding (f1, f2) coordinates for the image move closer to or fall within the bounds of target distribution 50. An output rendered image is provided at output 60 when the aim is met.

As an example for illustrative purposes, image contrast for the rendered image or region of interest may be less than satisfactory, the values for this property falling outside of an acceptable range that is specified in the selected image quality aim 130. In response, a variable parameter generated by rendering parameter generation step 140 and used by the rendering algorithm for image rendering step 160 can be appropriately increased or decreased and rendering step 160 executed once again for the image or ROI within the image. The next execution of rendering validation step 170 may indicate that the rendered image now exhibits acceptable contrast and conforms to image quality aim 130. Conversely, the next execution of rendering validation step 170 may indicate that the resulting change in contrast does not provide sufficient improvement, or there may even be a reduction in the measured contrast. Correction can then be applied by rendering parameter generation step 140, followed by another iteration of rendering and validation. It can be appreciated that this example can be expanded to encompass multiple image features and their properties. It can also be appreciated that there can be added complexity in cases wherein changes to rendering parameters may improve performance with respect to some properties for specific features, but have unintended effects for other features. For example, increasing the dynamic range may also have the unintended effect of increasing the signal-to-noise ratio for an image. In one embodiment, the feedback loop exits rendering validation step 170 if acceptable quality is not measured after a fixed number of iterations.

As the sequence of FIG. 1 indicates, image quality aim 130, typically obtained from some type of image processing model, is first used as one factor that helps to condition how rendering parameters are generated in step 140. Then, following rendering, image quality aim 130 is used for measurement, providing one or more parameters against which image rendering can be validated.

For efficiency, it is generally advantageous to have an adaptive system that limits the number of feedback loop iterations that are used during image processing. For example, if two or more processing iterations are regularly needed for processing a large percentage of the acquired images, processing efficiency can be improved by updating the prediction model and its generated image processing parameters or other data used to determine how the image is processed. Embodiments of the present invention monitor the relative frequency of feedback loop iterations and respond to excessive processing by analyzing information relevant to errors and adjusting various image processing parameters accordingly. The adjusted parameters can themselves be tested in order to further refine how images are processed and to reduce the number of images requiring multiple rendering processes.

To reduce unlimited feedback loops in image processing, embodiments of the present invention set a maximum feedback loop number. Once an image reaches the maximal number, its rendered image is outputted as the final result, along with an alert that indicates reaching the maximal feedback loop number. Such an alert can be displayed for the technologist to review, and can give the technologist the opportunity to correct any capture condition or parameters in order to improve the retake image quality. For example, the technologist may want to change one or more technique settings, such as the kVp or mAs settings, or use an appropriate grid to improve the image quality. An alert may also indicate the need for system calibration or other procedure.

Using the method of FIG. 1, a measure of consistency can thus be obtained in rendering diagnostic images. As can be appreciated, the relative degree of consistency that can be achieved is based, at least in part, on the setup of image quality aim 130. With respect to FIG. 4, parameters of image quality aim 130 effectively determine the size and shape of target distribution 50 and thus the amount of difference that is allowed between values of properties for identified features.

Still referring to the sequence of FIG. 1, there may be alternative results that are provided at output 60 following rendering validation step 170. For example, where there is excessive noise content in the image, it may not be feasible to process the image data for improved rendering. In such a case, output 60 includes a message for informing the user, displayed on an operator console for example, or a data record provided in some form that indicates failure of the rendering control loop to provide a suitable rendered output image for some reason. In another embodiment, output 60 provides information to a networked Quality Assurance (QA) system for assessment of a performance problem or other problem related to the imaging process. In one embodiment, the process may directly prompt the viewer to review results of feedback loop execution in order to obtain approval or to adjust parameters accordingly.

It is noted that the phrase "feedback loop" as used herein is a term of art generally used in digital processing to describe a looping operation that repeats one or more procedures based on assessing "feedback" or results data from previous processing. This distinguishes a feedback loop operation from a looping process that simply increments a counter to repeat an operation a fixed number of times, for example. However, as noted earlier, the feedback loop of the present invention can be constrained to operate no more than a fixed number of times, as tracked by the extra step of incrementing and checking a counter, for example, not specifically shown in the basic flow diagram of FIG. 1.

Setting Up Image Quality Aims

Figure 5A:
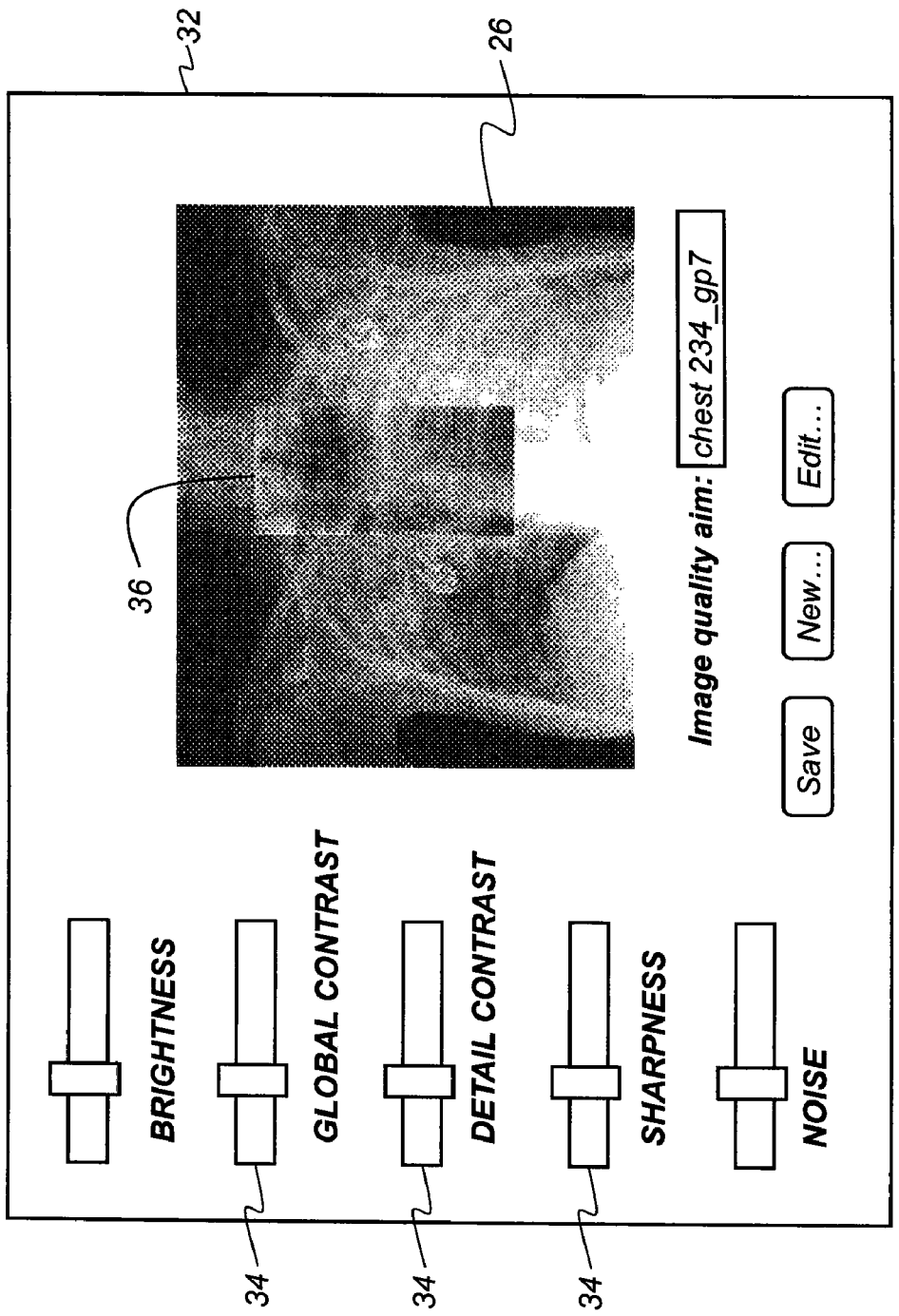
FIG. 5A shows an operator interface for obtaining image quality aim parameters.

An image quality aim 130 that is suited to a particular radiologist, to a specified image type, or for a designated imaging apparatus, hospital, or other entity, can be set up in a number of ways. In one embodiment, as shown in FIG. 5A, a benchmark image 26 is provided on a display screen 32. The viewer then enters suitable image quality parameters using a set of controls 34, or using some other entry mechanism. Software allows the viewer to generate, edit, and save one or more image quality aims suitable for a specific image type or feature by viewing and making changes to the appearance of the corresponding benchmark image. The software analyzes the benchmark image when saved by the viewer and extracts the needed information as to suitable image characteristics. A number of user interface utilities can be used in order to obtain viewer entries and selections, including graphical user interface (GUI) tools that use a touchscreen or use a mouse or other pointer, for example.

As shown in FIG. 5A, these same procedures could be used for setting up image quality aims 130 (FIG. 1) for a full benchmark image 26 or for one or more regions of interest (ROI) 36 within the benchmark image. For example, a touchscreen or other pointer entry can be used to specify ROI 36 and to electronically save settings of controls 34 specifically for this particular type of ROI within the chest x-ray or other type of image. This same type of sequence can be used where there are multiple ROIs or other features, allowing individual parameter settings and corresponding image quality aim 130 for each of a set of multiple ROIs within an image.

Figure 5B:
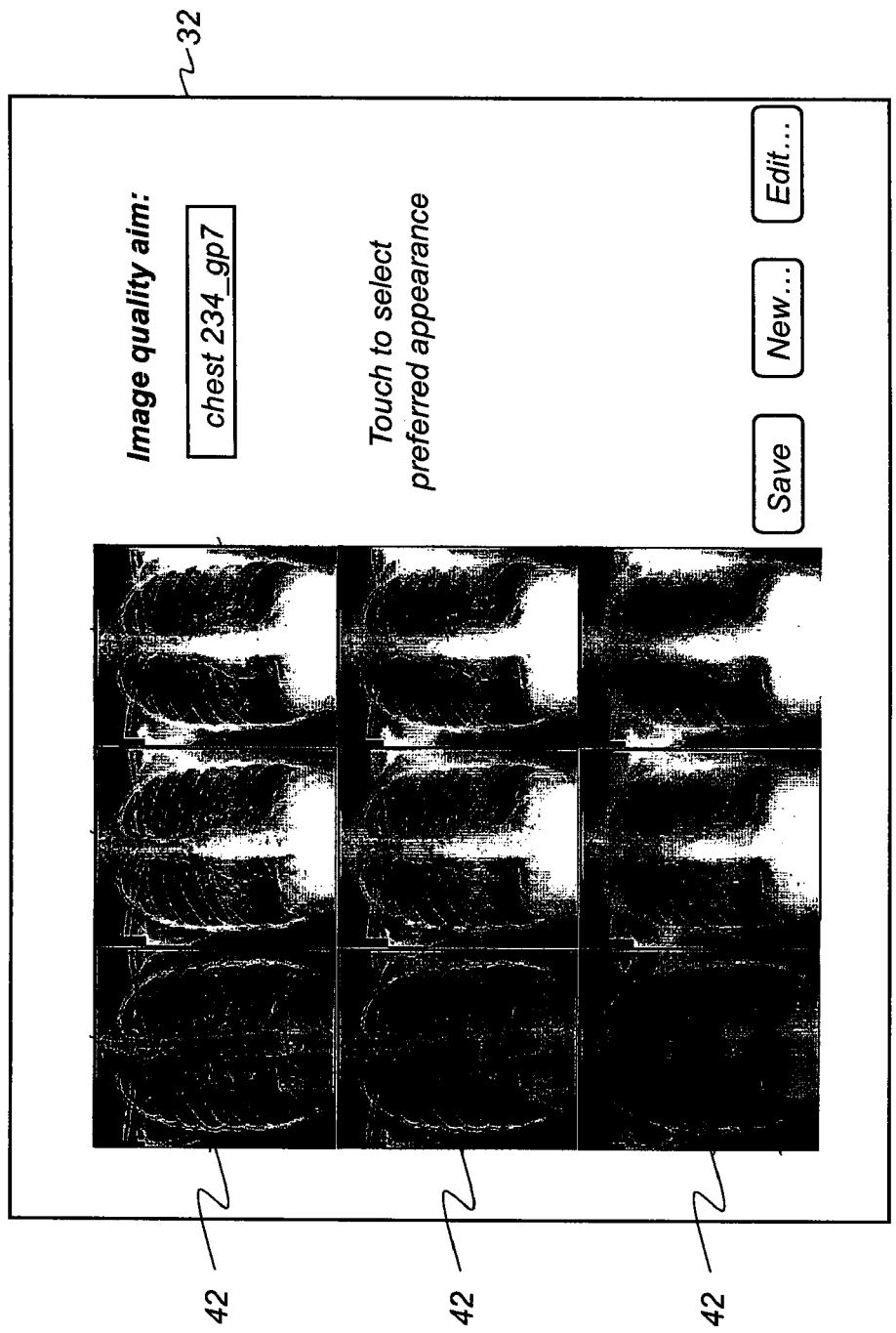
FIG. 5B shows an alternate operator interface for obtaining image quality aim parameters.

The plan view of FIG. 5B shows an alternate user interface arrangement in which a set of thumbnail images 42 appear, each image having different appearance due to different rendering parameter settings. In the particular example shown, detail is increased moving up the screen, dynamic range is increased in moving across from left to right. The viewer selection is then saved and used to set up the corresponding image quality aim 130 (FIG. 1). Again, software is provided to analyze the particular image selected by the viewer and to extract the needed information as to suitable image quality characteristics. Multiple image quality aims 130 can also be obtained and stored from a user interface display in this manner.

In another embodiment, a series of benchmark images are used as a training set and one or more skilled viewers are presented with the different images in the training set in order to grade or score them for suitability. Neural network or other adaptive logic for "learning" viewer responses is then trained according to rendering characteristics that are judged most suitable by the expert viewers. The software analyzes user scoring and preferences and determines what quality metrics apply for each image type. For example, automated image processing tools can detect image contrast or other characteristics. Over time, additional data points can be gathered, improving the statistical accuracy available for obtaining suitable properties for the various image features. In an alternate embodiment, image quality aims 130 are obtained from statistical data computed from a given set of multiple images, without the need for specific expert observer evaluation of each individual image.

Example for Obtaining Image Quality Aim 130

It is useful to consider an example for which image quality aims 130 may have particular value for assessment and diagnosis and are related to viewer preferences. The PA chest x-ray is one type of image that is particularly rich in the type of information it can provide and can be used for diagnosis of a number of different conditions.

Radiologist A prefers image sharpness and a high level of detail contrast for chest x-ray images for viewing lung fields. Radiologist B, with a slightly different purpose, prefers a very broad dynamic range for the same type of image. The same stored image quality aim 130 is not likely to satisfy both radiologists. A first image quality aim is set up and electronically stored for use by radiologist A, providing heightened contrast over the lung field ROI. An alternate image quality aim with a broadened dynamic range over denser (darker) areas of the ROI is set up and stored for use by radiologist B. The image rendering process of FIG. 1 is carried out for each image quality aim 130, with feedback based upon validation of the rendering process as described earlier.

Rendering an image can be highly complex, involving a number of variables, with results and acceptability to an individual viewer difficult to predict. This problem is further complicated because of variables such as imaging system differences; patient size, age, gender, and positioning; technologist training and performance; and other characteristics that affect the overall image quality and appearance of the obtained x-ray. The feedback loop of the present invention, as shown in FIG. 1, provides an automated way to validate that specific parameters or ranges of values have been applied and, where needed, to readjust rendering parameters and repeat the rendering process when rendered results fall outside of an acceptable range with respect to one or more particular image features and their attributes. Using appropriate image quality aims, the image can be rendered, analyzed, and checked against those aims to determine whether or not the image is rendered appropriately. This method can be used for the complete image as well as for one or more regions of interest or individual features within the image.

Supplementary information that relates to technologist, equipment, or departmental performance can also be extracted from the image quality validation process. Such information can be used in conjunction with various image metadata in order to provide statistical data that may help administrators to determine training needs, maintenance or calibration requirements, or other needed support functions. However, unlike system solutions that may merely provide performance reporting for imaging technologists, the apparatus and methods of the present invention also apply image processing tools, with a control loop to assess and correct image rendering, in order to provide more usable and accurate diagnostic imaging.

The processing performed for the present invention is executed at a computer or other type of processor or may be executed over a network using more than a single processor. For example, image quality aims may be set up and stored at different locations along a network and may be addressed and accessible by a separate processor that executes the basic image processing function. It should be noted that image rendering and image display are also processor-intensive operations, making particular demands on computer processing power where the display is a high-resolution display, such as that used in the diagnostic imaging environment.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST

20. Image
24. Spine midline
26. Benchmark image
28. Lung centerline
30. ROI
32. Display screen
34. Control
36. Region of interest
40. Histogram
42. Set of thumbnail images
50. Target distribution
60. Output
100. Image rendering process
110. Analysis and feature extraction step
112. Segmentation step
114. Detection step
116. ROI location step
118. Frequency band decomposition step
120. Operator control
122. Feature computation step
130. Image quality aim
140. Rendering parameter generation step
160. Image rendering step
170. Rendering validation step
F1, F1', F1",F2. Feature
ΔF1',ΔF1" Difference

What is claimed is:

1. A method for medical diagnostic image processing executed at least in part by a computer and comprising:
    obtaining digital image data for a diagnostic image;
    extracting one or more image features from the image data and obtaining one or more image properties from the one or more extracted features;
    obtaining an image quality aim for rendered image appearance according to one or more electronically stored viewer preferences;
    generating rendering parameters according to the obtained image quality aim and the one or more obtained image properties;
    rendering the image according to the generated rendering parameters; and
    validating the rendered image against the selected image quality aim.

2. The method of claim 1 wherein the image quality aim is selected from a plurality of electronically stored image quality aims.

3. The method of claim 1 wherein the image quality aim is computed from a predetermined set of images.

4. The method of claim 1 wherein extracting one or more image features further comprises:
    segmenting a body part within the image;
    detecting a rough outline of anatomical structures inside a skinline; and
    locating one or more regions of interest within the skinline.

5. The method of claim 1 wherein extracting one or more image features further comprises decomposing image content into two or more frequency bands.

6. The method of claim 5 wherein generating the rendering parameters is performed separately for one or more of the frequency bands and wherein rendering the image further comprises recombining the image content of the two or more frequency bands.

7. The method of claim 1 wherein generating rendering parameters further comprises using a prediction model that is derived using the obtained image quality aim.

8. The method of claim 7 further comprising adjusting the prediction model based on learning.

9. The method of claim 7 wherein the prediction model is derived using statistical computation.

10. The method of claim 7 wherein the prediction model is derived using machine learning.

11. The method of claim 1 wherein validating the image rendering comprises
    extracting image features from the rendered image; and
    evaluating the image features against a target distribution of the obtained image quality aim.

12. The method of claim 1 further comprising executing a feedback loop that comprises repeating the steps of generating rendering parameters, rendering the image, and validating the image rendering one or more times.

13. The method of claim 12 further comprising correcting the rendering parameters according to results from the image validation.

14. The method of claim 13 wherein correcting the rendering parameters further comprises the step of collecting statistical information from the feedback loop.

15. The method of claim 1 wherein the one or more obtained image properties is taken from the group consisting of image contrast, image density, image brightness, latitude, sharpness, regional density, signal-to-noise ratio, contrast-to-noise ratio, image data range, and image histogram values.

16. The method of claim 1 wherein obtaining the image quality aim comprises obtaining viewer adjustments to variable image properties for one or more displayed images.

17. The method of claim 1 further comprising prompting the viewer to review results of feedback loop execution.

18. A method for medical diagnostic image processing executed at least in part by a computer and comprising:
    obtaining digital image data for a diagnostic image;
    extracting one or more image features from the image data and obtaining one or more image properties from the one or more extracted features;
    obtaining an image quality aim for rendered image appearance according to one or more stored viewer preferences;
    generating rendering parameters according to the obtained image quality aim and the one or more obtained image properties;
    rendering the image according to the generated rendering parameters;
    validating the image rendering against the selected image quality aim; and
    executing a feedback loop one or more times, the feedback loop comprising repeated steps of generating rendering parameters, rendering the image, and validating the image rendering against the selected image quality aim.

19. The method of claim 18 further comprising exiting the feedback loop following a predetermined number of iterations.

20. The method of claim 18 further comprising exiting the feedback loop according to the results of validating the image rendering against the selected image quality aim.

* * * * *